UNITED STATES PATENT OFFICE.

JASPER WHITING, OF CHICAGO, ILLINOIS.

MANUFACTURE OF CEMENT.

SPECIFICATION forming part of Letters Patent No. 544,706, dated August 20, 1895.

Application filed February 5, 1895. Serial No. 537,404. (No specimens.)

*To all whom it may concern:*

Be it known that I, JASPER WHITING, residing at Chicago, Cook county, Illinois, have invented a certain new and useful Improvement in the Manufacture of Cement, of which the following is a specification.

My invention has for its object the manufacture, mainly from blast-furnace or other slags, of a cement which shall be equal in quality to the best Portland or other similar cement, and which shall at the same time be more economical of manufacture. In my method I have obviated the necessity of calcining the compound or in any manner continuing the heating or of reheating the same, excepting that for drying purposes, whereby a consequent saving in expense is obviously obtained without detracting from the character and quality of the product. Slag is practically inexhaustible in supply, and when after proper treatment, as hereinafter set forth, it is combined with one or more other elements it forms a valuable factor for a cement of superior quality and durability; and my invention consists in the following-described process: I prefer to use the molten slag direct from blast-furnaces and as it runs therefrom to bring it into contact with water in any suitable manner and in such quantity that the material is completely chilled. By the action of the water the slag becomes disintegrated and is reduced to a porous, spongy, or sandy condition. This material is thoroughly dried and is intimately mixed with slaked lime and caustic soda, potash, sodium chloride, or equivalents, or any substance of which the latter are ingredients. It will be understood, therefore, that when I use the term "soda" or "caustic soda" in the claims or elsewhere I intend to include potash and all similar substances giving the same effect. The proper proportions of the lime and soda are dependent upon the chemical character of the particular slag used, which is to be determined by analysis. The whole mass is then ground to extreme fineness and is then ready to be packed in bags or barrels for the market without calcination or heating whatever.

The amount of slaked lime and caustic soda (or equivalent) to be added depends upon the composition of the slag used, as hereinbefore stated. The amount of slaked lime added will therefore vary between nothing and thirty per cent. of the finished product, according to the basicity of the slag used, and in the case of the caustic soda from one-eighth per cent. to three per cent. of the chemically-pure article, depending chiefly upon the use for which the cement is intended.

The caustic soda may, if desired, be added to the slaked lime in an aqueous solution and the resulting mixture dried before incorporating it with the slag, or it may be added in a dry state to the slaked lime, or the three materials may all be mixed in some proper machine. If desired, however, they may all be admitted practically unmixed into the grinding-machine and thereby become intimately associated, the one with the other, in the process of reduction. If it is desired to use certain pulverizing-machines, the materials may be mixed after the grinding or pulverizing process and before packing for the market.

A cement possessing hydraulic qualities may be produced from certain slags by the addition of caustic soda (or equivalent) alone in the proportion above described, but the quality of the product will generally be improved by the addition of some slaked lime. It is seldom necessary that more than two per cent. of chemically-pure caustic soda (or equivalent) need be used and for ordinary purposes a smaller amount will be found sufficient. The presence of the caustic soda renders the resulting cement much stronger and quicker setting, and by varying its proportions a cement of any desired quality can be obtained. The action and purpose of the caustic soda in my process may be stated as follows:

Slag chilled in water is only slightly soluble in water or milk of lime, and the action between it and the slaked lime is therefore very slow. A briquette made of this material shows in twenty-four hours only one hundred and fifty pounds per square inch tensile strength. When caustic soda or equivalent is added in the manner described above and water added to the dry cement, the soda dissolves and an alkaline solution is formed which readily attacks the slag, forming a silicate of soda. This in turn is immediately broken up by the action of the lime present, a tricalcic silicate or cement being formed, and the soda is set free to act on more slag. In this manner by acting as a sort of medium or carrier it helps the lime and slag to quickly unite to form a cement. A briquette made in the way described will after twenty-four hours show as high as nine hundred and twenty-five pounds per square inch tensile strength.

While I am aware that the idea of mixing chilled slag with slaked lime to form a cement is not new and that soda has been added to ordinary calcined Portland cement, still I am not aware that caustic soda or its equivalent or substitute has been added to slag cement for the purpose and in the manner above described. By the peculiar action of the soda, as set forth, I am enabled to produce a quick-setting cement of great strength and high hydraulic properties and obtained mainly from blast-furnace or other slags without calcination or other application of heat.

If it is desired to immediately form the composition into bricks or refractory materials with or without compression, the soda in solution, with or without slaked lime, may be added to the slag which has been previously chilled in water. If a particularly fine quality of brick is required, the slag may be passed through a grinding-machine either before or after its incorporation with the soda with or without the addition of slaked lime. These bricks may be colored by the proper ingredients added thereto, such as iron ore, &c., or they may be vitrified in any of the ordinary methods, such as by immersing in a solution of brine or other materials and subjecting to heat.

I claim—

1. The method of manufacturing cement from slags which consists in chilling molten slag in water, drying and grinding the product and adding thereto caustic soda or its equivalent in a dry state.

2. The method of manufacturing cement from slags which consists in chilling molten slag in water as it comes from the furnace, drying and grinding the slag and adding thereto slaked lime and caustic soda both in a dry state and in the proportions substantially as set forth.

3. A cement composed of blast furnace or other slag in a dry pulverized form and caustic soda in a dry state, in substantially the proportions set forth.

4. A cement composed of blast furnace or other slag in a dry pulverized form and caustic soda and slaked lime in a dry state and substantially in the proportions set forth.

JASPER WHITING.

Witnesses:
SAMUEL E. HIBBEN,
E. NEMETT.